(12) United States Patent
Kowarz et al.

(10) Patent No.: US 7,289,209 B2
(45) Date of Patent: Oct. 30, 2007

(54) PROGRAMMABLE SPECTRAL IMAGING SYSTEM

(75) Inventors: Marek W. Kowarz, Rochester, NY (US); James G. Phalen, Rochester, NY (US); Jeffrey Daniel Newman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 261 days.

(21) Appl. No.: 11/021,258

(22) Filed: Dec. 21, 2004

(65) Prior Publication Data

US 2006/0017924 A1 Jan. 26, 2006

Related U.S. Application Data

(60) Provisional application No. 60/590,131, filed on Jul. 22, 2004.

(51) Int. Cl.
*G01J 3/28* (2006.01)
(52) U.S. Cl. ...................................... 356/330
(58) Field of Classification Search ................. 356/330
See application file for complete search history.

(56) References Cited

U.S. PATENT DOCUMENTS

| | | | | |
|---|---|---|---|---|
| 4,790,654 A * | 12/1988 | Clarke | ......................... | 356/310 |
| 5,090,807 A * | 2/1992 | Tai | .............................. | 356/310 |
| 5,570,180 A * | 10/1996 | Nagai | ......................... | 356/330 |
| 5,689,317 A | 11/1997 | Miller | ......................... | 349/97 |
| 5,828,451 A | 10/1998 | Bellus et al. | ................ | 356/326 |
| 5,892,612 A | 4/1999 | Miller et al. | ................ | 359/250 |
| 6,307,663 B1 | 10/2001 | Kowarz | ....................... | 359/231 |
| 6,373,568 B1 * | 4/2002 | Miller et al. | ................. | 356/326 |
| 6,411,425 B1 | 6/2002 | Kowarz et al. | ............. | 359/291 |
| 6,678,085 B2 | 1/2004 | Kowarz et al. | ............. | 359/291 |
| 6,690,466 B2 * | 2/2004 | Miller et al. | ................. | 356/326 |
| 6,825,930 B2 * | 11/2004 | Cronin et al. | ................ | 356/328 |
| 2002/0176151 A1 * | 11/2002 | Moon et al. | ................. | 359/298 |
| 2005/0243312 A1 * | 11/2005 | Geshwind et al. | .......... | 356/310 |

OTHER PUBLICATIONS

"Realization of the Hadamard Multiplex Advantage Using a Programmable Optical Mask in a Dispersive Flat-Field Near-Infrared Spectrometer" by R.A. DeVerse et al., *Appl. Spectrosc. 54*, 2000, pp. 1751-1758.

"Optimization and Characterization of an Imaging Hadamard Spectrometer" by C.M. Wehlburg et al., *Proc. SPIE 4381*, 2001, pp. 506-515.

* cited by examiner

*Primary Examiner*—Layla G. Lauchman
*Assistant Examiner*—Bryan Giglio
(74) *Attorney, Agent, or Firm*—Stephen H. Shaw

(57) ABSTRACT

An imaging system having a programmable spectral transmission function, that includes an input image plane for passing input imaging light into the imaging system; a dispersive optical system for separating the input imaging light into its corresponding spectral components, thus creating spectrally-dispersed image components along a spectrally-dispersed direction. Also included is a spatial light modulator, having a plurality of operational states, for selecting spectral components for imaging; and having a width along the spectrally-dispersed direction; a de-dispersive optical system for re-combining the selected spectral components for imaging onto a detector array; and means for scanning the input imaging light from an object of interest to generate an output area image.

9 Claims, 14 Drawing Sheets

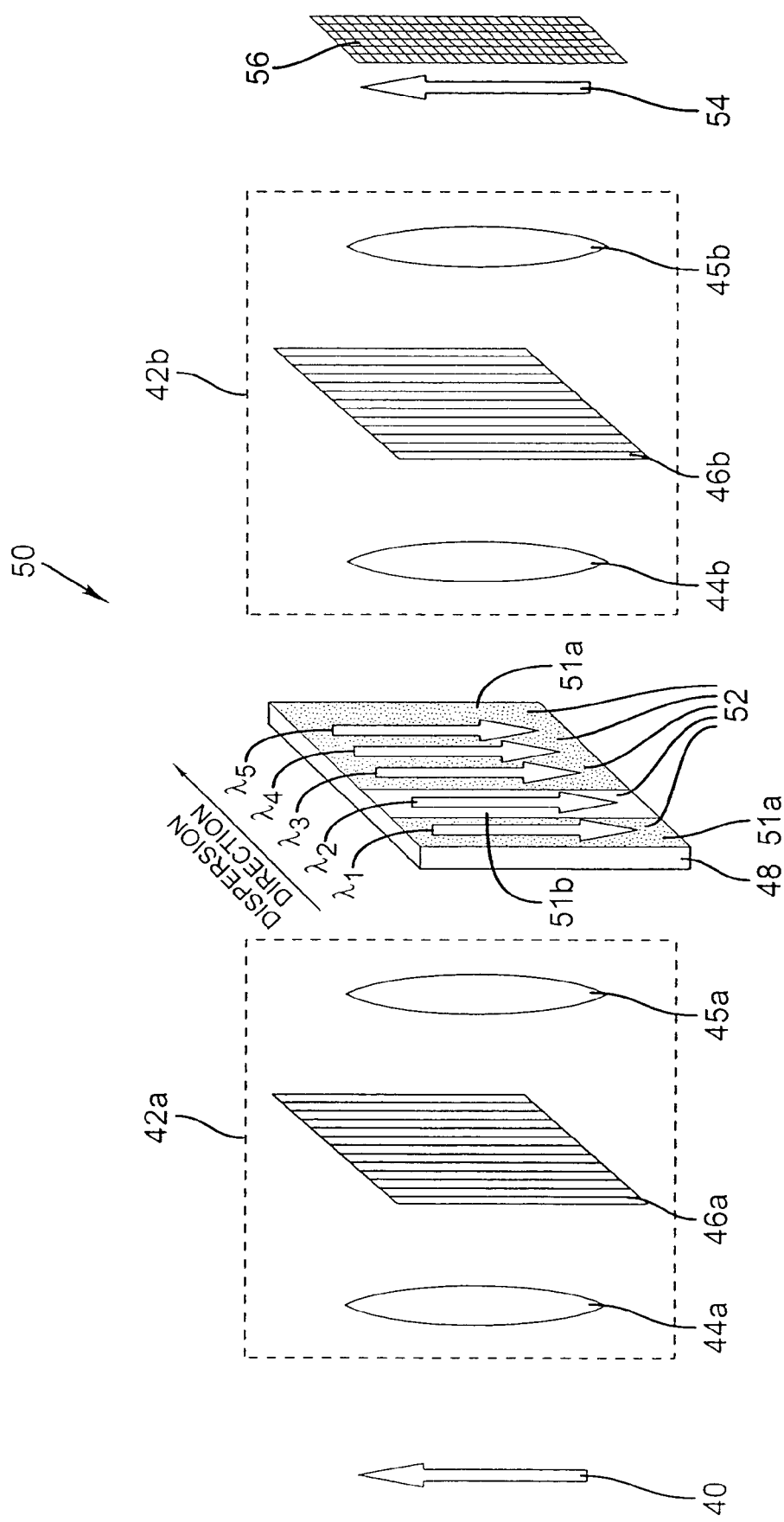

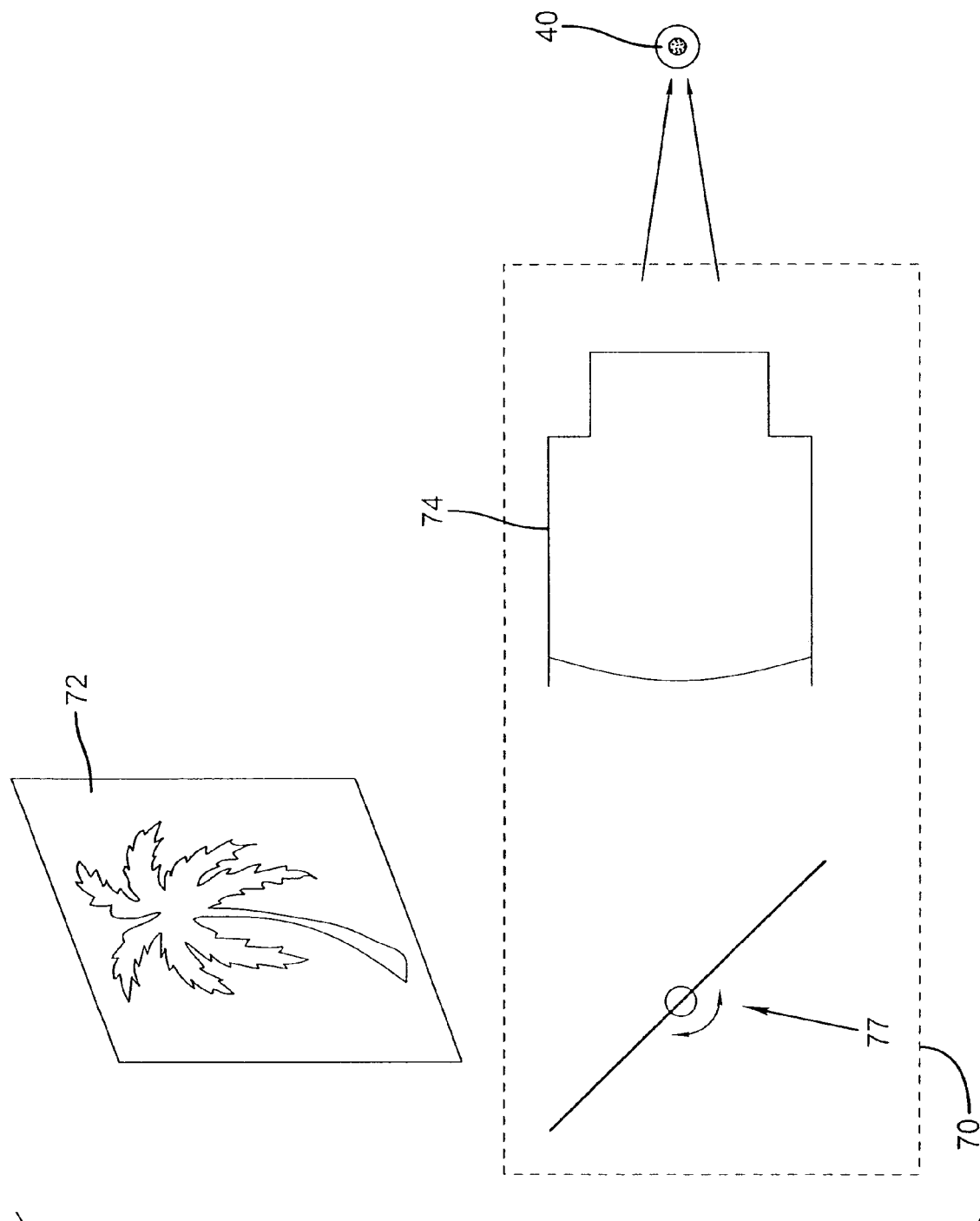

PROGRAMMABLE SPECTRAL IMAGING SYSTEM

CROSS-REFERENCE TO RELATED APPLICATIONS

Reference is made to commonly assigned co-pending Provisional Application Ser. No. 60/590,131, entitled "Programmable Spectral Imaging System" and filed on 22 Jul. 2004 in the names of Marek W. Kowarz, James G. Phalen, and J. Daniel Newman, which are assigned to the assignee of this application.

FIELD OF THE INVENTION

This invention relates to an imaging system with a spectral transmission function that is electronically controllable. More specifically, this invention relates to a programmable spectral imaging system that contains a spatial light modulator for selecting spectral components for imaging.

BACKGROUND OF THE INVENTION

Multi-spectral and hyper-spectral imaging systems, where more than 3 colors are captured by an imager, are of interest for a variety of remote sensing, health, and industrial applications. Multi-spectral imaging (MSI) systems are typically designed with thin-film spectral filters situated in front of detector arrays. MSI systems provide excellent image quality with short detector integration times and modest data sets. They are used in both line-scanned configurations, with linear detector arrays, and full-field configurations, with area detector arrays. The MSI approach can only image a relatively small number of spectral bands, typically 4 to at most 8, and these spectral bands are fixed once the system is built. Hyper-spectral imaging (HSI) systems, on the other hand, use a grating or prism to disperse the various image wavelengths onto an area detector array, providing one spatial axis and one spectral axis. HSI systems are therefore flexible and capable of capturing a vast amount of spectral information, in many very narrow spectral bands. However, compared to MSI systems, the integration times are much longer, the hyper-spectral data sets are extremely large and the spatial resolution is lower. Furthermore, in practice, only a small subset of the captured hyper-spectral data cube is of interest.

Programmable spectrometers and programmable spectral imaging systems, where the spectral transmission function can be modified, have been proposed and implemented using electrically-controlled light modulators in two fundamentally different system configurations: 1) tunable transmissive filters based on liquid crystal devices, acousto-optic devices, or tunable Fabry-Perot cavities and 2) programmable dispersion-based systems with a spatial light modulator consisting of an array of individually addressable devices.

Liquid crystal tunable filters have been disclosed by Miller in U.S. Pat. No. 5,689,317, issued on Nov. 18, 1997, entitled "TUNABLE COLOR FILTER" and by Miller et al. in U.S. Pat. No. 5,892,612, issued Apr. 6, 1999, entitled "TUNABLE OPTICAL FILTER WITH WHITE STATE." However, liquid crystals are relatively slow (typically, 10-100 msec), have low efficiency and are not space compatible. A programmable spectral imaging system with an acousto-optic tunable filter has been disclosed by Bellus et al. in U.S. Pat. No. 5,828,451, issued Oct. 27, 1998, entitled "SPECTRAL IMAGING SYSTEM AND METHOD EMPLOYING AN ACOUSTO-OPTIC TUNABLE FILTER FOR WAVELENGTH SELECTION WITH INCREASED FIELD OF VIEW BRIGHTNESS." In general, the tunable filter approach can only pass a single spectral band at a time to the detector array and the spectral bandwidth is predetermined and not tunable.

Programmable dispersion-based systems have been demonstrated using a variety of spatial light modulators, including liquid crystal display panels and, more recently, micro-electromechanical mirror arrays such as the Texas Instruments DMD. In the dispersion-based approach, the input light is sent through a prism or grating to separate the various wavelengths onto the spatial light modulator. The modulator then selects the wavelengths of interest, which are sent to the detector. Most of these dispersion-based systems have been non-imaging or point imaging, utilizing only a single detector element. In a single detector configuration, a 2D image can be generated by raster scanning an object of interest by using, for example, a pair of scanning mirrors.

A non-imaging DMD-based spectrometer for sample analysis is described by R. A. DeVerse et al., "Realization of the Hadamard Multiplex Advantage Using a Programmable Optical Mask in a Dispersive Flat-Field Near-Infrared Spectrometer," Appl. Spectrosc. 54, pp. 1751-1758 (2000). They show that, when many narrow spectral bands are of interest, signal-to-noise performance can be improved by simultaneously measuring multiple bands using the Hadamard transform approach, rather than measuring the spectral bands sequentially.

An area-imaging programmable spectral imager that does not contain any moving components has been described by C. M. Wehlburg et al., "Optimization and Characterization of an Imaging Hadamard Spectrometer," Proc. SPIE 4381, pp. 506-515 (2001). Their Hadamard transform spectral imager (HTSI) is a double Offner system with an area detector array. It uses one Offner relay with a curved grating to disperse and reimage the input light onto a DMD. A second Offner relay then de-disperses and reimages the selected components onto the detector array. There are a number of issues with this configuration. 1) The DMD design is not well suited for an Offner system because the DMD is designed for off-axis illumination. With proper illumination and on-axis collection optics, the DMD produces high contrast modulation. However, in the double Offner configuration, the illumination and collection conditions are not satisfied and the DMD contrast would be low. The imaging performance of the double Offner with a DMD is also questionable because of the tilted image planes associated with the tilt angles of the micro-electromechanical mirrors. 2) The curved grating in the Offner is difficult to fabricate and very difficult to blaze for high diffraction efficiency. Therefore, Offner spectrometers have low efficiency and a double Offner spectrometer would have very low efficiency. 3) The HTSI system is designed for imaging of relatively small objects, i.e., objects that are small compared to the size of the detector array. If the HTSI system were used for extended objects, the spectral cross-talk between various parts of the object would be severe. For example, if the object fills (or overfills) the HTSI detector array, a single wavelength image of the object would fill approximately ½ of the DMD. Under this condition, spectral cross-talk in the HTSI would prevent capture of a simple 3-color image.

Recently, an electromechanical conformal grating device consisting of ribbon elements suspended above a substrate by a periodic sequence of intermediate supports was disclosed by Kowarz in U.S. Pat. No. 6,307,663, issued on Oct. 23, 2001, entitled "SPATIAL LIGHT MODULATOR WITH CONFORMAL GRATING DEVICE." Display systems based on a linear array of GEMS devices were described by Kowarz et al. in U.S. Pat. No. 6,411,425, entitled "ELECTROMECHANICAL GRATING DISPLAY SYSTEM WITH SPATIALLY SEPARATED LIGHT BEAMS," issued Jun. 25, 2002 and by Kowarz et al. in U.S. Pat. No. 6,678,085, entitled "HIGH-CONTRAST DISPLAY SYSTEM WITH SCANNED CONFORMAL GRATING DEVICE," issued Jan. 13, 2004. The electromechanical conformal grating device is operated by electrostatic actuation, which causes the ribbon elements to conform around the support substructure, thereby producing a grating. The device of '663 has more recently become known as the conformal GEMS device or, more simply, GEMS device, with GEMS standing for grating electromechanical system. The GEMS device possesses a number of attractive features. It has a large active region that provides high-speed digital light modulation with high contrast and good efficiency for on-axis illumination. In addition, the device can be fabricated at low cost with relatively few masks in a CMOS or CCD foundry.

There is a need therefore for a high-resolution imaging system that has a programmable spectral transmission function and can rapidly image large extended objects. There is also a need for a programmable spectral imaging system that provides good spectral selectivity with high efficiency over a large spectral range. There is a further need for a programmable spectral imaging system that can employ electromechanical grating devices.

SUMMARY OF THE INVENTION

The aforementioned need is met according to the present invention by providing an imaging system having a programmable spectral transmission function, that includes an imaging system having a programmable spectral transmission function, that includes an input image plane for passing input imaging light into the imaging system; a dispersive optical system for separating the input imaging light into its corresponding spectral components, thus creating spectrally-dispersed image components along a spectrally-dispersed direction. Also included is a spatial light modulator, having a plurality of operational states, for selecting spectral components for imaging; and having a width along the spectrally-dispersed direction; a de-dispersive optical system for re-combining the selected spectral components for imaging onto a detector array; and means for scanning the input imaging light from an object of interest to generate an output area image.

Another aspect of the present invention is a method for employing a spatial light modulator to select spectral components for line-scan imaging, including the steps of:

a) passing input imaging light into an imaging system;

b) separating the input imaging light into its corresponding spectral components, thus creating spectrally-dispersed image components;

c) selecting spectral components for imaging using the spatial light modulator;

d) directing the selected spectral components for imaging onto a detector array; and e) scanning the input imaging light from an object of interest to generate an output area image.

A third aspect of the present invention is a two-arm imaging system having a programmable spectral transmission function, that includes an input image plane for passing input imaging light into the imaging system; a first arm, comprising: a first dispersive optical system for separating the input imaging light into its corresponding spectral components, thus creating spectrally-dispersed image components; a first spatial light modulator, having a plurality of operational states, for selecting first spectral components for imaging; a first de-dispersive optical system for re-combining the selected first spectral components for imaging onto at least one detector array. A second arm, comprises: a second dispersive optical system for separating the input imaging light into its corresponding spectral components, thus creating spectrally-dispersed image components; a second spatial light modulator, having a plurality of operational states, for selecting second spectral components for imaging; a second de-dispersive optical system for re-combining the second selected spectral components for imaging onto the at least one detector array; and a light separating element for directing the input imaging light toward the first and second arms.

BRIEF DESCRIPTION OF THE DRAWINGS

FIG. 1a illustrates the basic architecture of a programmable spectral imaging system in a transmissive configuration.

FIG. 1c illustrates the subsystem that scans input imaging light from an extended object.

FIG. 4b illustrates the patterned mirror of the embodiment in FIG. 4a.

FIG. 5b illustrates the patterned dichroic of the embodiment in FIG. 5a.

DETAILED DESCRIPTION OF THE INVENTION

Figure 1B:
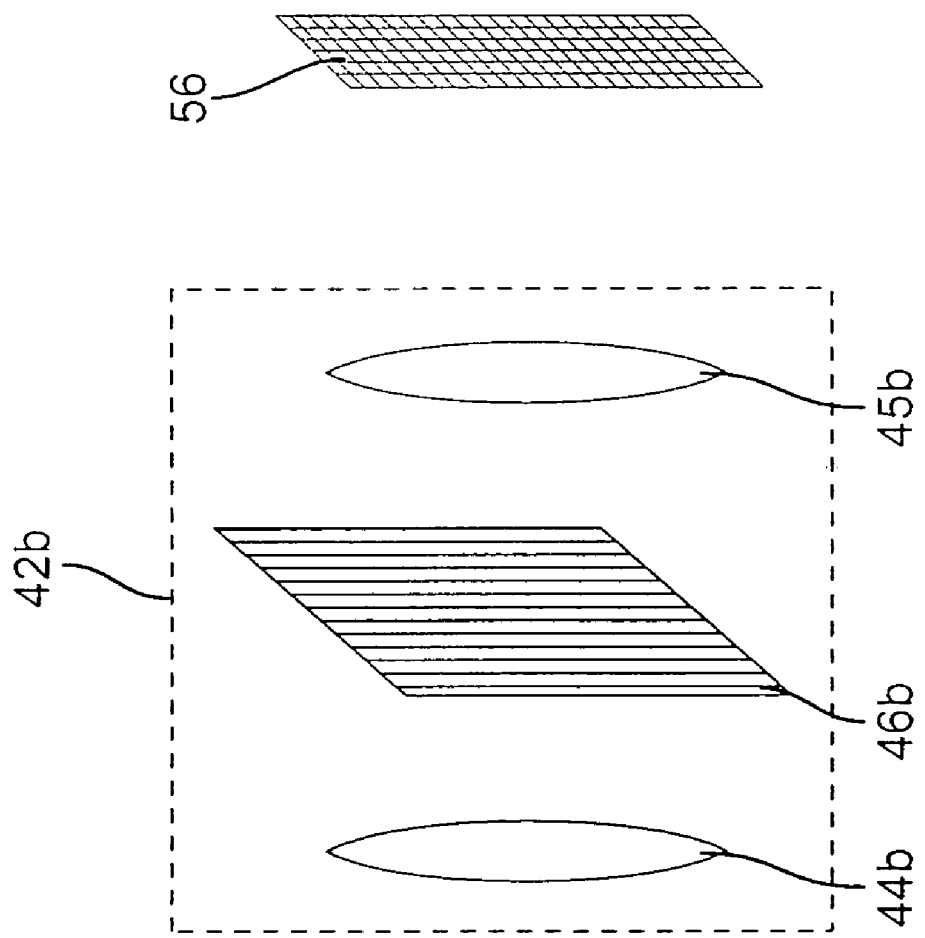
FIG. 1b depicts a portion of the programmable spectral imaging system of FIG. 1a, with the projected monochromatic image of the detector array shown on the spatial light modulator.
Figure 1B:
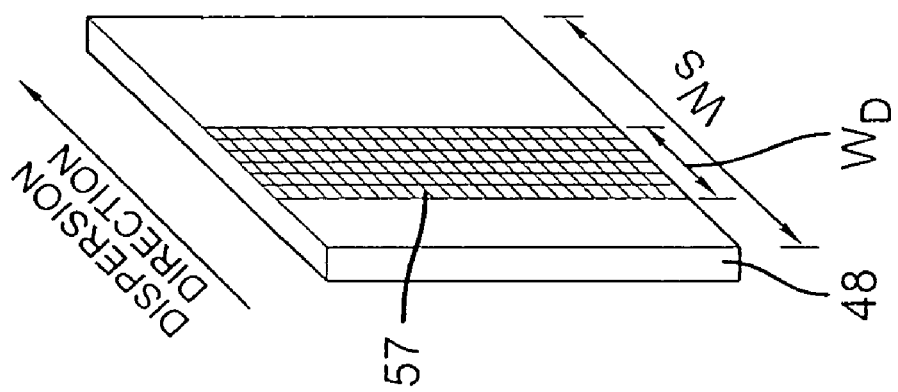

FIGS. 1a, 1b and 1c illustrate the basic principles of the programmable spectral imaging system 50, shown here in a transmissive configuration. A dispersive imaging subsystem 42a reimages the spectral components of an input multi-wavelength image 40, producing spectrally-dispersed images 52 in an intermediate image plane. In FIG. 1*a*, five distinct spectrally-dispersed images 52 are shown with wavelengths $\lambda_1$, $\lambda_2$, $\lambda_3$, $\lambda_4$ and $\lambda_5$. More typically, a continuous distribution of spectrally-dispersed images 52 would be formed. The intermediate image plane contains a spatial light modulator 48 that is controlled electronically to pass desired spectral components through the system and block undesired ones. Unblocked spectral components are reimaged by a de-dispersive imaging subsystem 42*b*, providing a spectrally-filtered output image 54 on the detector array 56. In FIG. 1*a*, shaded regions on the spatial light modulator 48 indicate a blocking operating state 51*a* that prevents unwanted spectral components from reaching the detector array 56. Regions that are not shaded indicate an unblocking operating state 51*b* that allows the unblocked spectral components to be imaged.

As illustrated in FIG. 1*a*, the dispersive imaging subsystem 42*a* contains lenses 44*a* and 45*a* and a transmission grating 46*a*. Lens 44*a* produces a Fourier transform of the input multi-wavelength image 40 near the transmission grating 46*a*, which generates spectral dispersion by diffracting the various wavelengths at different angles. For a high-efficiency system, a blazed or holographic volume phase grating is preferred. As is well-known in the art, dispersion could be also be generated by other components, such as prisms or reflection gratings. Lens 45*a* takes another Fourier transform, generating the spectrally dispersed images 52. The dispersive and de-dispersive imaging subsystem, 42*a* and 42*b*, are similar and, as will be described later, could be the same physical system. In the de-dispersive imaging subsystem 42*b*, which contains lenses 44*b* and 45*b*, the function of transmission grating 46*b* is to remove the angular difference between the various wavelengths. Ideally, the spectrally-filtered output image 54 is then a perfect image of the multi-wavelength image 40 with a programmable spectral transmission function determined by the operating states of the various regions on the spatial light modulator 48.

The programmable spectral imaging system 50 concept of FIG. 1*a* can be adapted for different types of spatial light modulators. For example, those skilled in the art will recognize that, with the addition of a pair of polarizers, the spatial light modulator 48 could be a transmissive LCD panel. The system can also be adapted for other modulator technologies, such as liquid crystal on silicon (LCOS), DMD or other micromirror arrays, or diffractive spatial light modulators. Embodiments of the programmable spectral imaging system 50 in FIG. 2 through FIG. 5*c* illustrate the invention for the case of a diffractive spatial light modulator.

The programmable spectral imaging system 50 is intended to work with a variety of objects, including large extended objects such as those found in satellite remote sensing applications. In order to image and discriminate different spectral bands for such extended objects, the spectrally-dispersed images 52 need to be sufficiently separated on the spatial light modulator 48. For example, in order to capture a simple 3 band RGB image of an extended object, assuming that the object fills or nearly fills the detector array, the width $w_D$ of the projected monochromatic image of the detector array 56 on the spatial light modulator 48 should be less than approximately ⅓ of the width $w_S$ of the spatial light modulator 48, in the spectrally-dispersed direction. FIG. 1*b* depicts the projected monochromatic image 57 on the spatial light modulator 48 for the system of FIG. 1*a*. In most cases, it is desirable to have a system capable of capturing and clearly resolving significantly more than 3 distinct spectral bands, which requires $w_D \ll w_S$.

In order to selectively capture many spectral bands without significant spectral crosstalk, the programmable spectral imaging system 50 is preferably configured in a line-scanned mode, as depicted in FIG. 1*c*. An area output image of an extended object 72 is then captured one line at a time, or a few lines at a time, with some means for scanning the input imaging light from the extended object 72. In FIG. 1*c*, line-scanning is performed by a scanning subsystem 70, consisting of a lens 74, which collects the input imaging light and creates the input multi-wavelength image 40, and a scanning mirror 77. It should be noted that the view in FIG. 1*c* is rotated 90 degrees with respect to the view in FIG. 1*a*. As is well known in the art, there are many different means for line scanning. The scanning mirror 77 could be an oscillating galvanometer, a rotating polygon or a MEMS-based mirror. Alternatively, a moving lens or other moving optical component could be used. In a system with a moving image capture platform, such as a remote sensing satellite or aircraft, the physical motion of the platform could simply perform the scanning. For systems such as microscopes, the object could also be physically translated.

The detector array 56 in FIG. 1*a* can be a linear array, a multi-linear array, a time-delayed-integration (TDI) linear array or an area array. For visible and near-IR wavelengths, the preferred detector arrays are CCD or CMOS image sensors similar to those commonly found in digital cameras and document scanners because of their high performance and low cost. When the programmable spectral imaging system 50 is configured in a line-scanned mode for use in a low signal environment, the detector array is preferably a time-delayed integration linear array, or an area array with off-chip processing used to perform time-delayed integration. The time-delayed integration is then temporally synchronized with the line scanning.

Figure 2:
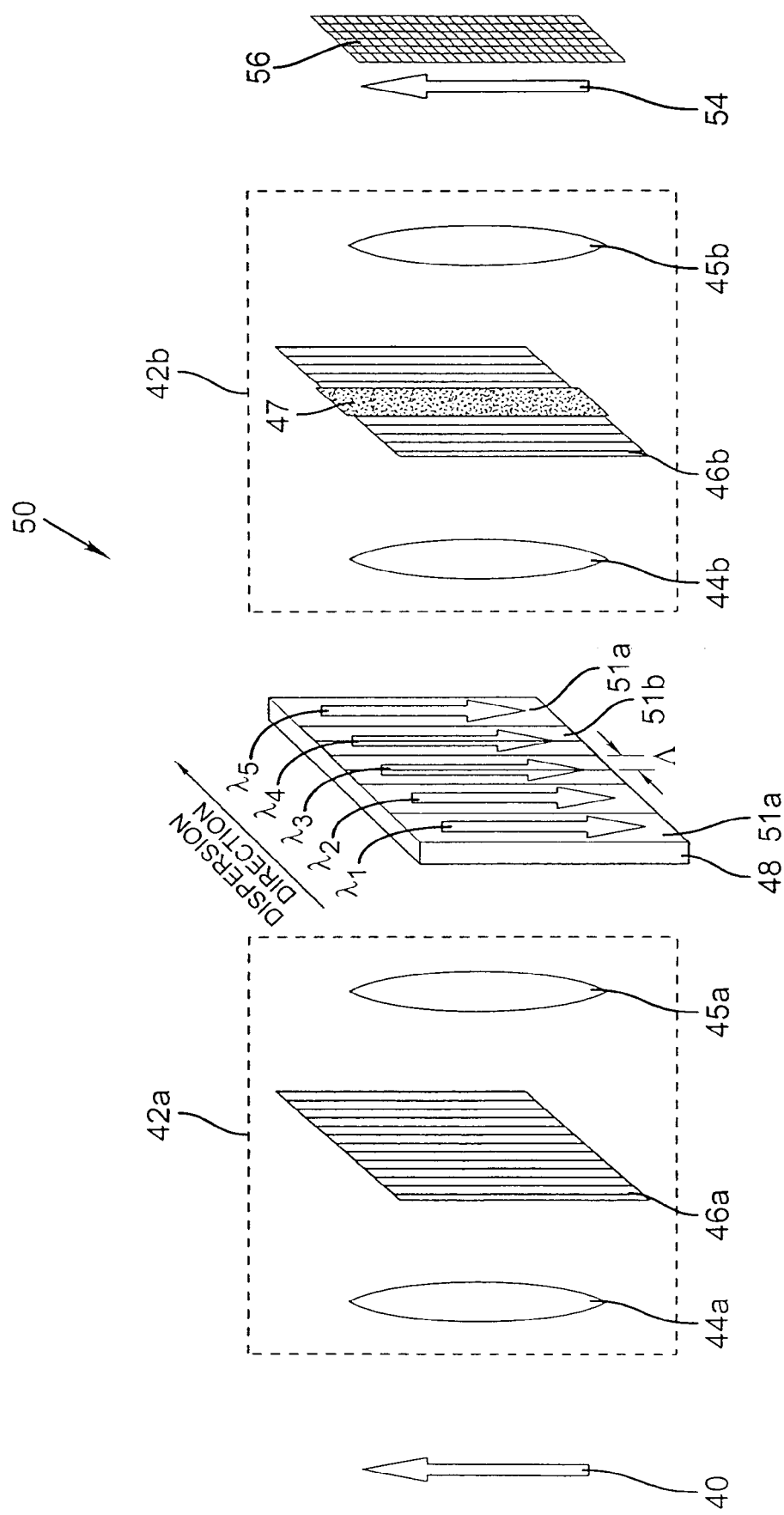
FIG. 2 is an embodiment with a diffractive spatial light modulator.

FIG. 2 depicts an embodiment of the programmable spectral imaging system 50 with a spatial light modulator 48 that modulates light by switching between a diffractive transmissive state with grating period $\Lambda$ and a non-diffractive transmissive state. The grating period $\Lambda$ is oriented parallel to the dispersion direction. In this configuration, the spatial light modulator 48 could be, for example, an electro-optic or acousto-optic device. In the Fourier plane of the de-dispersive imaging subsystem 42*b*, the $0^{th}$ order undiffracted light is physically separated from the diffracted light. A stop 47 is used to block the undiffracted light. Therefore, in FIG. 2, the blocking operating state 51*a* corresponds to the non-diffractive transmissive state and the unblocking operating state 51*b* to the diffractive transmissive state.

Figure 3A:
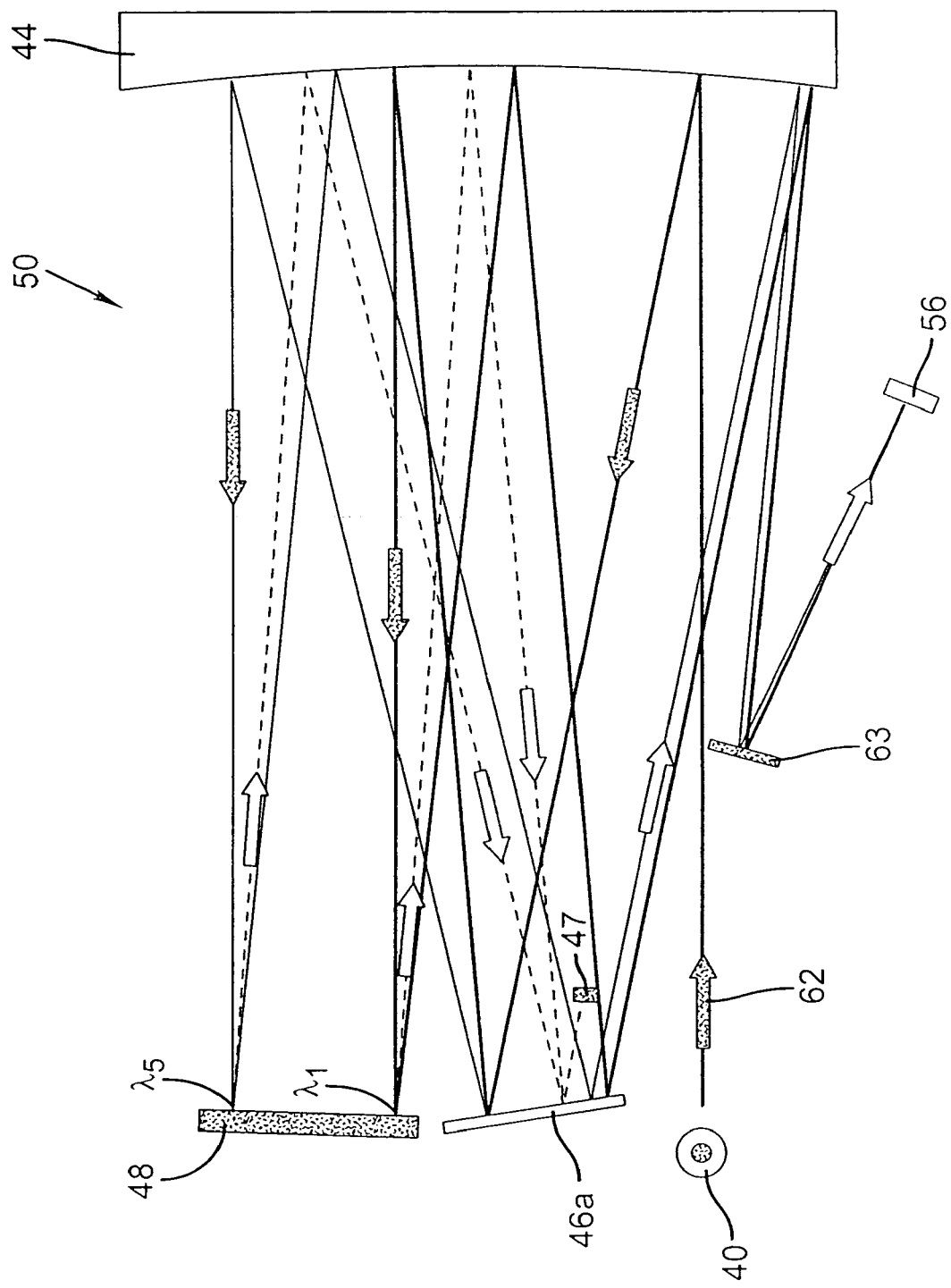
FIG. 3a is an embodiment in a double-pass reflective configuration, based on an Ebert imaging spectrometer.
Figure 3B:
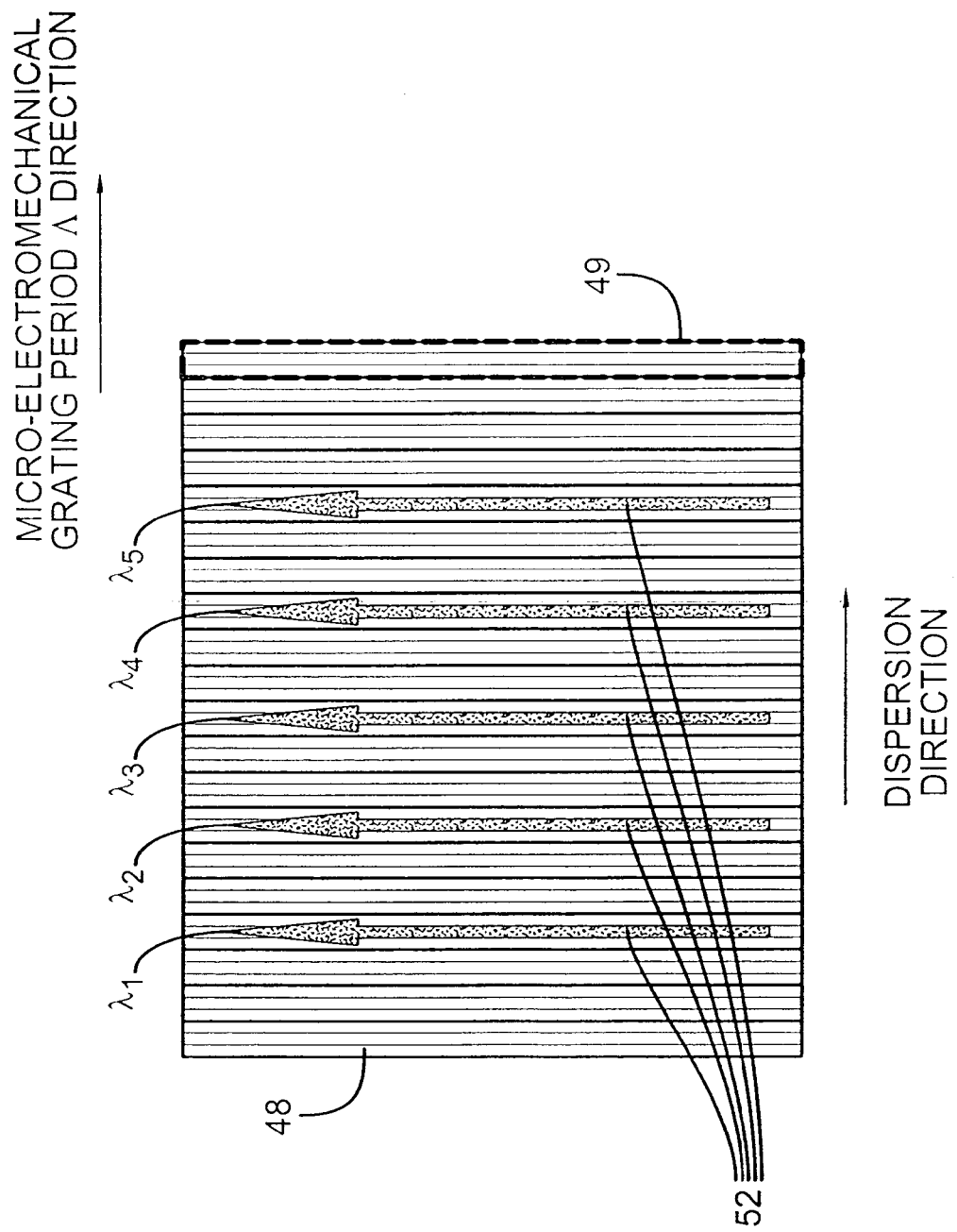
FIG. 3b depicts spectrally dispersed images on a spatial light modulator that is a micro-electromechanical grating device.

FIG. 3*a* shows an embodiment of the present invention in a double-pass reflective configuration, based on an Ebert imaging spectrometer. A single primary mirror 44 together with a reflection grating 46 perform the function of both the dispersive and de-dispersive imaging subsystems. To obtain high system efficiency, the reflection grating 46 should be blazed. The rays shown in FIG. 3*a* correspond to the case when the spatial light modulator 48 is a micro-electromechanical grating device, preferably a GEMS device. Input imaging light 62 from the input multi-wavelength image 40 is focused by the primary mirror 44, which produces a Fourier transform of the input at the reflection grating 46. After dispersion by the grating 46, the primary mirror 44 takes another Fourier transform, generating the spectrally dispersed images 52 on the spatial light modulator 48, as illustrated in FIG. 3*b* for the case of a micro-electromechanical grating device. The various regions on the micro-electromechanical grating device generate $0^{th}$ order undiffracted light and diffracted light depending on their operating state. Both the undiffracted and the diffracted light is then Fourier transformed by the primary mirror 44 and de-dispersed by the reflection grating 46. The undiffracted $0^{th}$ order light is blocked by a stop 47 near the reflection grating 46. The diffracted light is again Fourier transformed by the primary mirror 44, which then produces an image on the detector array 56. A small tilt on the micro-electromechanical grating device permits the diffracted light to be picked off by a turning mirror 63 in the optical path prior to the detector array 56. The small tilt also allows the $0^{th}$ order stop 47 to block the undiffracted light without obstructing the input light. As illustrated in FIG. 3b, for simplified manufacturing, the area of the micro-electromechanical grating device can be configured in a series of parallel modulator elements 49, each driven by its own input signal. Such a configuration eliminates the need for an active matrix backplane. For the case of a GEMS device, each parallel modulator element 49 would consist of a large number of electromechanical ribbons that are all electrically interconnected.

As is well known in the art, an Offner imaging spectrometer with a convex reflection grating produces significantly better imaging performance than an Ebert imaging spectrometer with a flat reflection grating. The programmable spectral imaging system 50 of FIG. 3a can be designed in an Offner configuration with a curved grating to provide higher performance imaging. However, up to now, Offner designs have had relatively low efficiency because of the fabrication difficulty associated with the blazing of a convex reflection grating. Even unblazed convex reflection gratings are difficult to fabricate. Without blazing, the efficiency of programmable spectral imaging system 50 with an Offner design would be very low, because of the double-pass configuration.

Figure 4A:
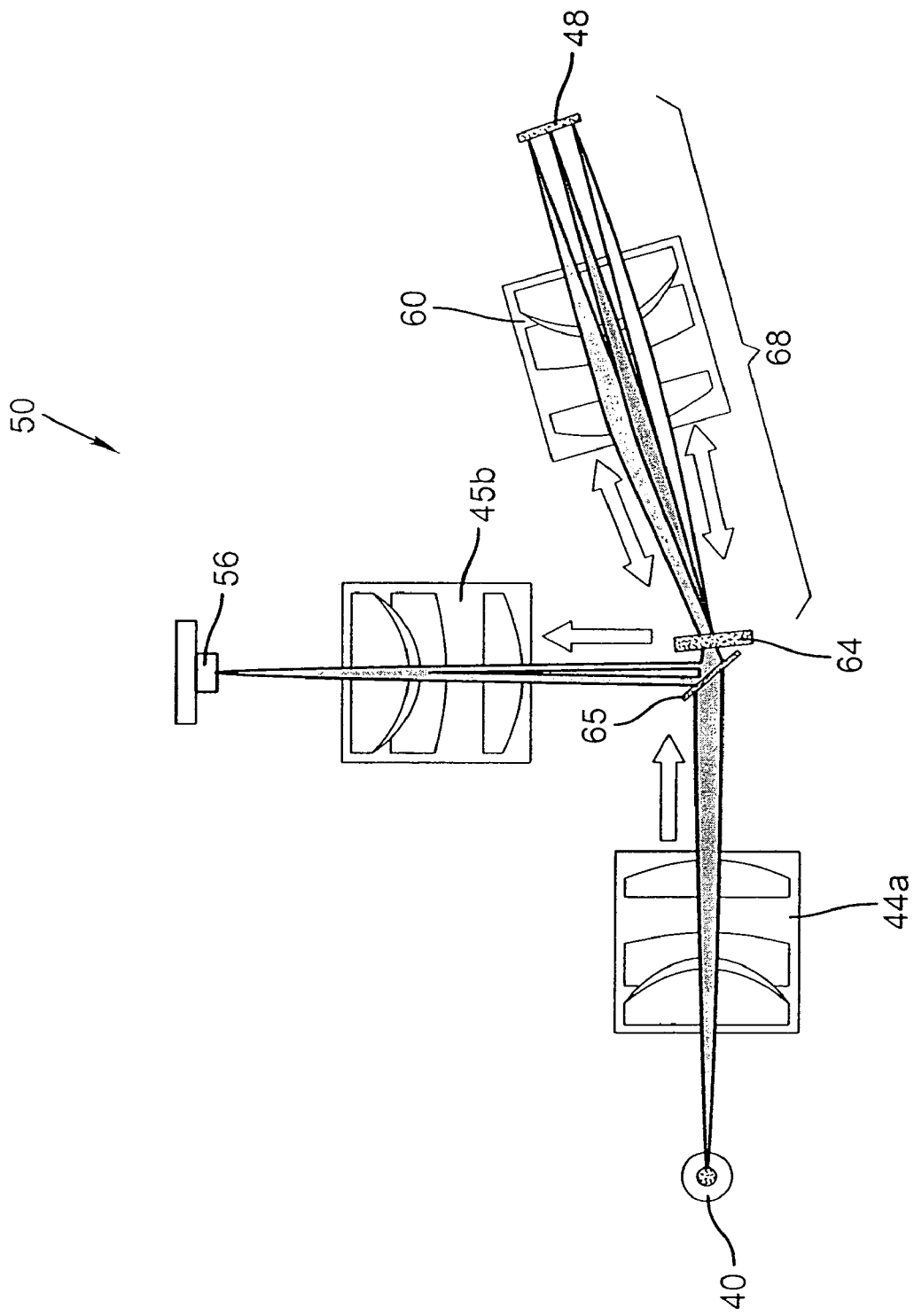
FIG. 4a is an embodiment with transmissive optical components that combines good imaging performance with high efficiency.
Figure 4B:
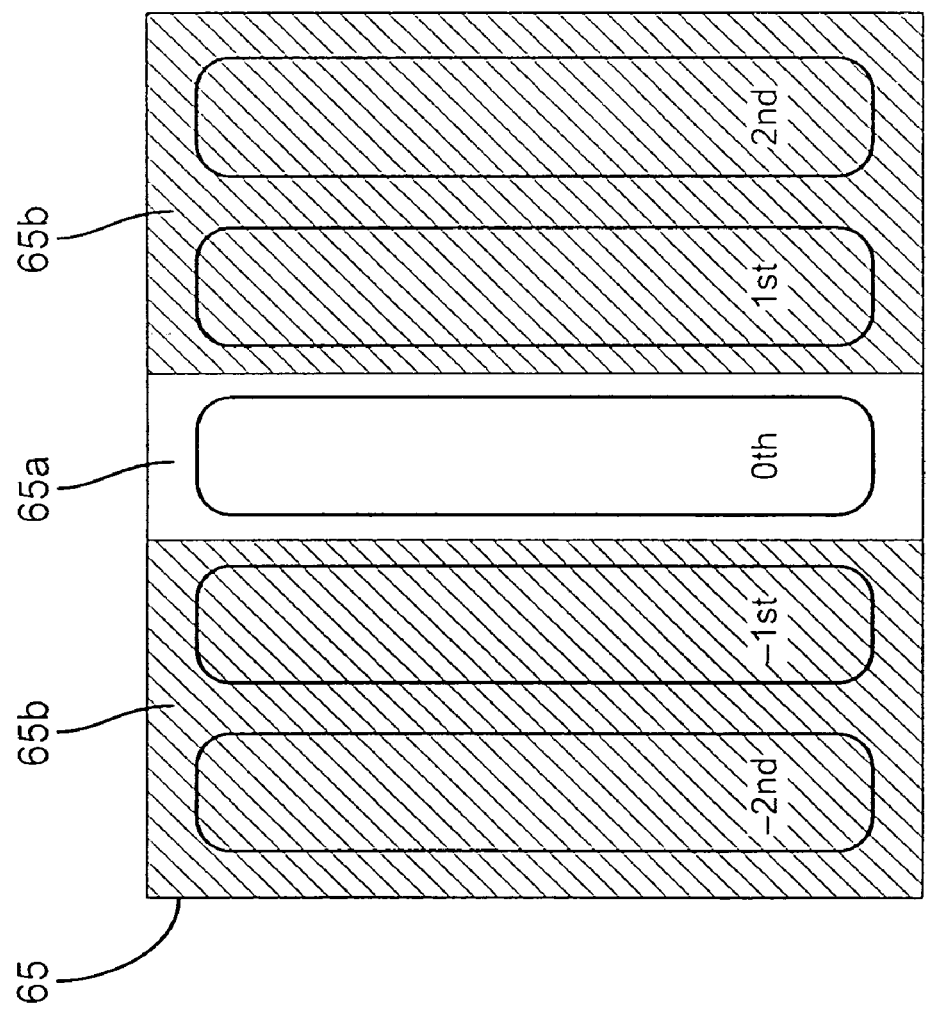

FIG. 4a illustrates an improved embodiment with transmissive optical components that combines good imaging performance with high efficiency. The grating is preferably a holographic volume phase grating 64 that has very high diffraction efficiency over a relatively wide spectral range. Input imaging light from the input multi-wavelength image 40 is Fourier transformed by lens 44a and passes through an opening in patterned mirror 65. As shown in FIG. 4b, the patterned mirror 65 consists of a transmissive region 65a surrounded by reflective regions 65b. The input imaging light is then sent into a dispersive arm 68 that is used in a double-pass configuration to perform dispersion, de-dispersion and selection of the spectral components of interest. In the dispersive arm 68, the input wavelengths are dispersed by the holographic volume phase grating 64 and Fourier transformed by lens 60, producing spectrally dispersed images 52 on the spatial light modulator 48. The operating state of the various regions on the spatial light modulator 48 determines which spectral components are re-imaged onto the detector array 56. Light returning from the spatial light modulator 48 is Fourier transformed by lens 60 and de-dispersed by the holographic volume phase grating 64. The spectral components selected for re-imaging are reflected by the reflective regions 65b on the planar patterned mirror 65 and are Fourier transformed by lens 45b, producing an image on the detector array 56.

As illustrated in FIG. 4a, the three lenses, 44a, 45b and 60, have the same focal lengths, providing unity magnification between the input multi-wavelength image 40, the spectrally dispersed images 52 and the image on the detector array 56. However, it will be apparent to those skilled in the art that the programmable spectral imaging system 50 could have non-unity magnification or even anamorphic magnification between any of the image planes. For example, a system could be designed with anamorphic magnification in lens 45b to change the F/# of light incident on the spatial light modulator 48, while still providing unity magnification between the input multi-wavelength image 40 and the image on the detector array 56.

The design of the patterned mirror 65 depends on the specific type of spatial light modulator 48 in the programmable spectral imaging system 50. FIG. 4b, as drawn, corresponds to the case when the spatial light modulator 48 is a GEMS device. The operating state of the GEMS device determines the spectral components that are imaged on the detector array 56. $0^{th}$ order undiffracted light, which contains unwanted spectral components, passes through the transmissive region 65a and is not used. Any residual $0^{th}$ order light can be eliminated with an additional stop placed between patterned mirror 65 and lens 45b. The diffracted orders ($+2^{nd}$, $+1^{st}$, $-1^{st}$, $-2^{nd}$ and higher orders), which contain desired spectral components, are reflected by the reflective regions 65b and are imaged on the detector array 56.

Figure 6B:
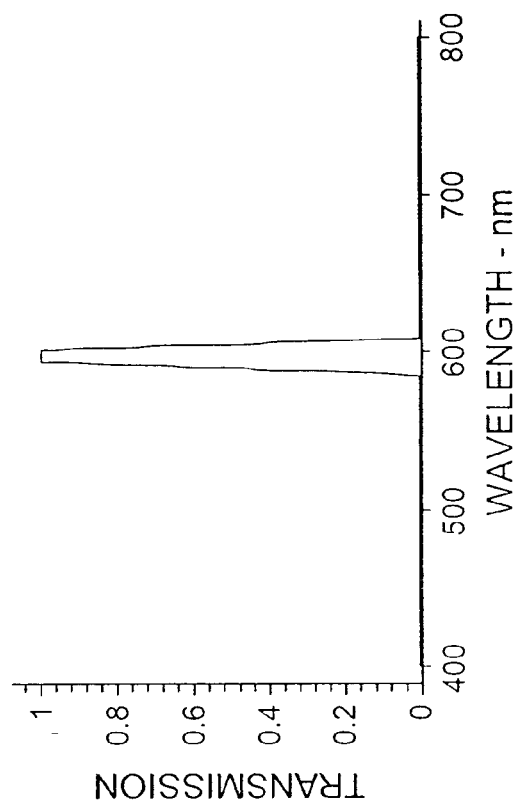
FIGS. 6a-6c show examples of the spectral transmission function when the programmable spectral imaging system is used to captures a single spectral band at a time.
Figure 6A:
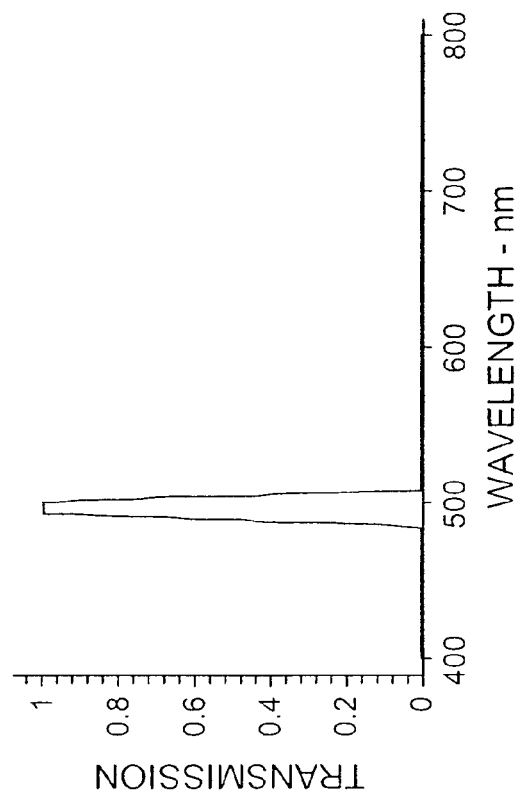
Figure 7:
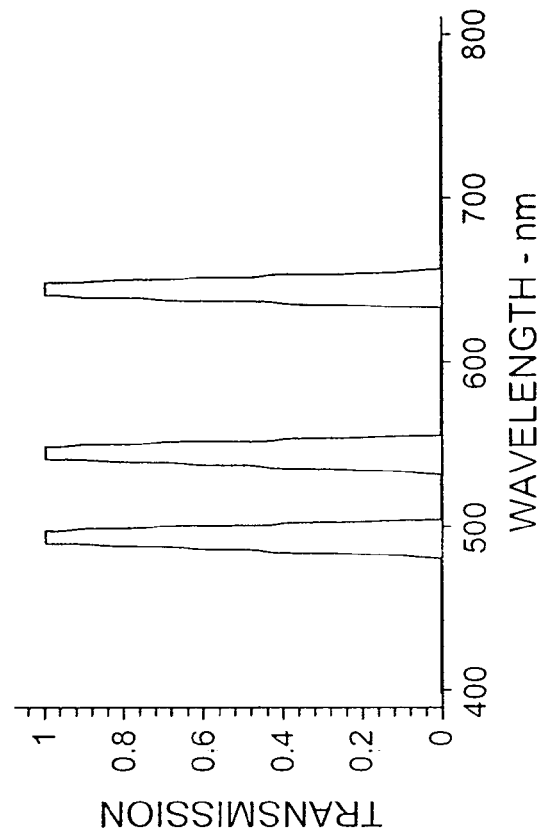
FIG. 7 shows an example of the spectral transmission function when the programmable spectral imaging system captures a set of spectral bands simultaneously.
Figure 6C:
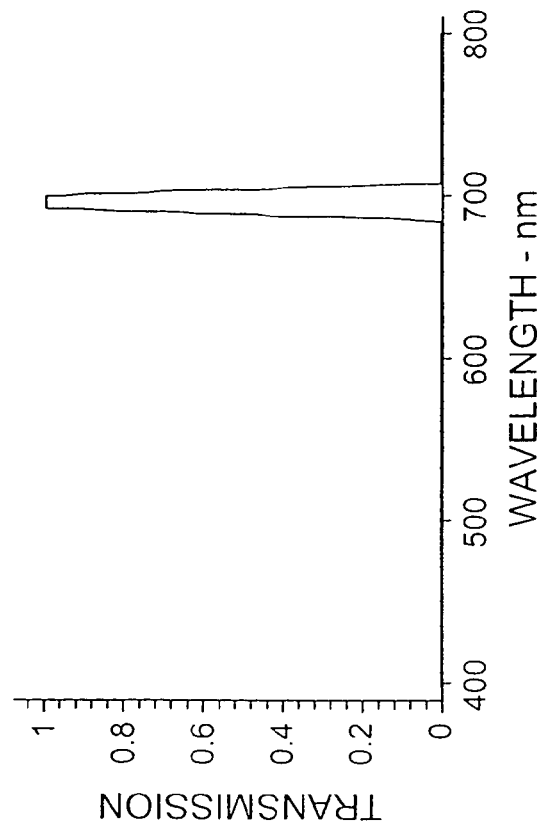

The programmable spectral imaging system 50 can be used to capture individual spectral bands in a time sequential fashion. For example, a spectral band centered at wavelength of 500 nm could be captured, followed by one centered at 600 nm, then by one centered at a 700 nm. This sequential approach is depicted in the idealized spectral transmission graphs of FIGS. 6a, 6b and 6c. Alternatively, the programmable spectral imaging system 50 can simultaneously capture wavelengths from a set of spectral bands, as illustrated in FIG. 7. The set of spectral bands can then be dynamically modified. This second approach, in which a set of spectral bands is imaged on the detector array 56, can be advantageous when seeking a specific spectral signature. It can also provide a higher signal-to-noise ratio, when many spectral bands are of interest, through the use of the Hadamard transform. In this approach, when images from individual spectral bands are of interest, instead of sequentially capturing the individual spectral bands on the detector array 56, sets of spectral bands are sequentially captured. The spectral images of interest are then reconstructed from the captured data sets using the Hadamard transform. The construction and selection of the sets of spectral bands is determined by the well-known S-matrices.

Figure 5A:
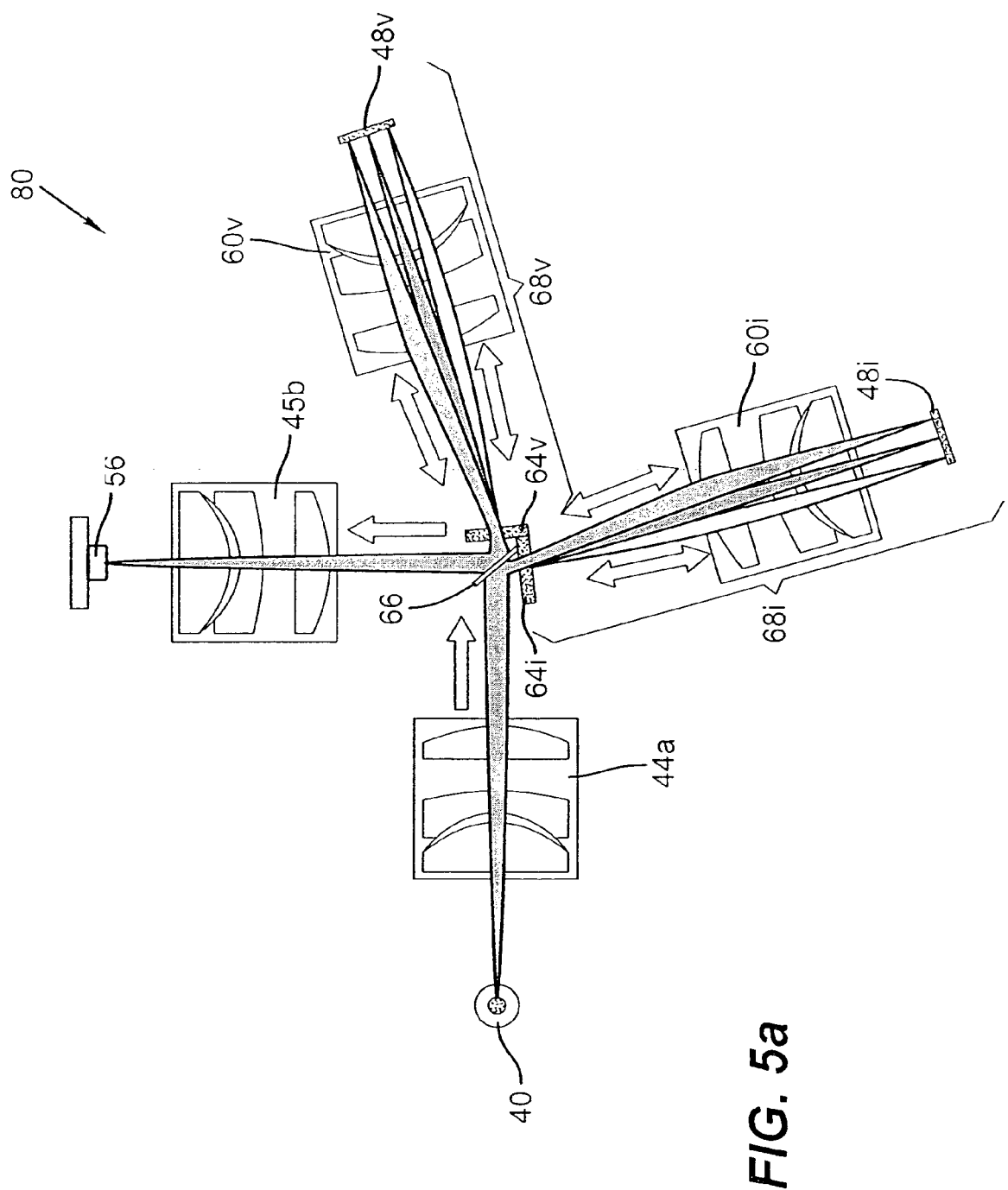
FIG. 5a illustrates a two-arm programmable spectral imaging system with a single detector array.

In above embodiments of the programmable spectral imaging system 50, the useful spectral range is limited by the roll-off in diffraction efficiency of the grating, used for dispersion and de-dispersion, and by any roll-off in efficiency of the spatial light modulator. As illustrated in FIG. 5a, an alternate embodiment consisting of a two-arm programmable spectral imaging system 80 can be used to provide increased spectral range compared to a single arm system. For example, a two-arm system with good efficiency could be designed to have a visible arm 68v, covering wavelengths between 440 nm and 660 nm, and a near-IR arm 68i, covering wavelengths between 660 nm and 1000 nm. The components of the visible arm 68v, i.e., spatial light modulator 48v, lens 60v and holographic volume phase grating 64v, can be optimized to operate in the visible range. The near-IR arm 68i, containing spatial light modulator 48i, lens 60i and holographic volume phase grating 64i, can be optimized independently for near-IR operation.

Figure 5B:
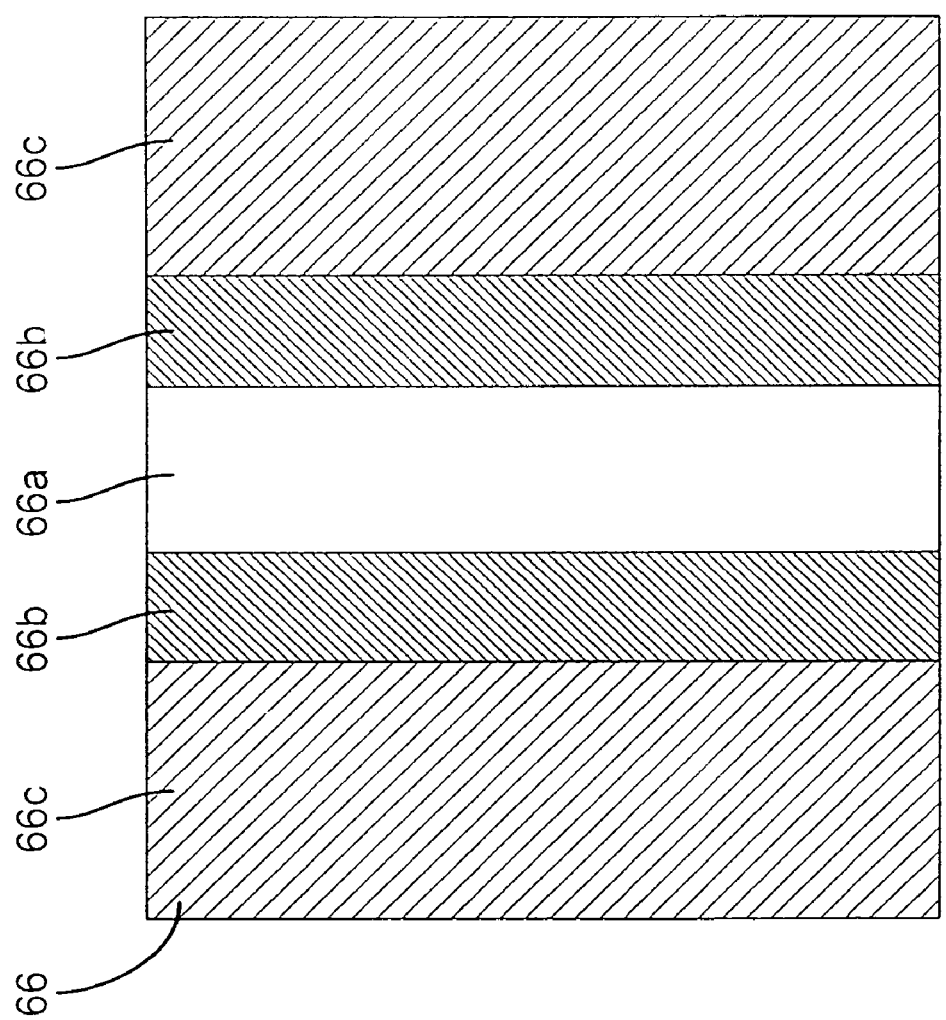

A patterned dichroic 66, depicted in FIG. 5b for the case of GEMS spatial light modulators, is used to separate light into the arms of the two-arm programmable spectral imaging system 80. The patterned dichroic 66 can contain three different dichroic coatings: dichroic region 66a, which transmits in the visible and reflects in the near-IR, dichroic region 66b, which reflects in both the visible and near-IR, and dichroic region 66c, which reflects in the visible and transmits in the near-IR. Clean-up filters (not shown) are used to eliminate IR light from the visible arm 68v and visible light form the near-IR arm 68i. Visible input light is transmitted into the visible arm 68v by dichroic region 66a, whereas near-IR input light is reflected into the near-IR arm 68i by both dichroic region 66a and dichroic region 66b. $0^{th}$ order undiffracted light returning from the two arms is recombined by dichroic regions 66a and 66b and is sent back towards the input multi-wavelength image 40. Diffracted orders from the visible arm 68v are reflected towards the detector array 56 by dichroic regions 66b and 66c. On the other hand, diffracted orders from the near-IR arm 68i are transmitted towards the detector array 56 through dichroic region 66c.

It will be apparent to those skilled in the art that the two-arm programmable spectral imaging system 80 could be designed to have both arms covering the same spectral range. Such a design can provide better overall light throughput than a single arm system. A simple patterned mirror 65, similar to the one of FIG. 4b or one with a more complex pattern, can then replace the patterned dichroic 66

Figure 5C:
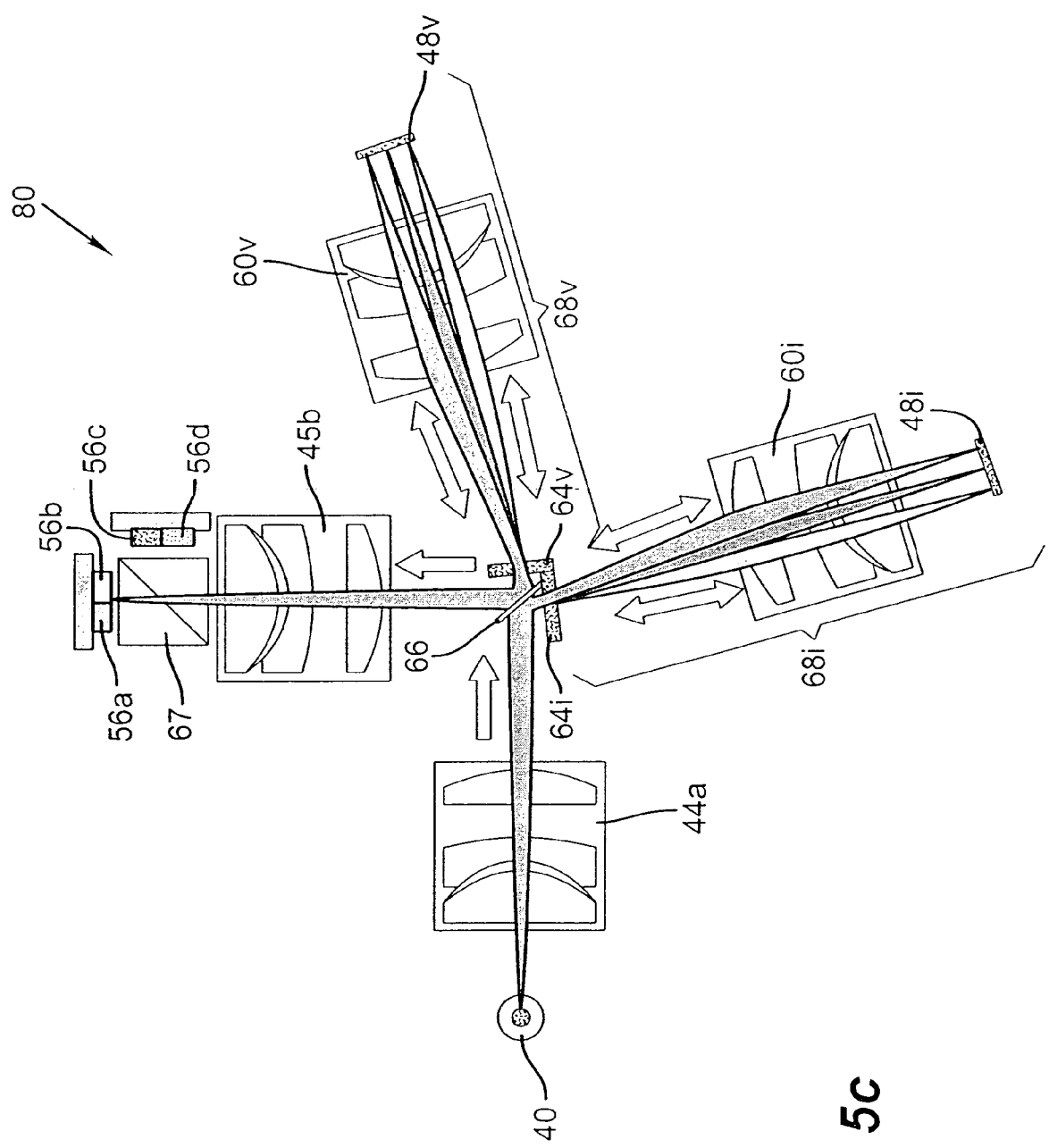
FIG. 5c illustrates a two-arm programmable spectral imaging system with four detector arrays.

The above embodiments enable imaging of a single spectral band, or of a single set of spectral bands, at one time. FIG. 5c depicts a two-arm programmable spectral imaging system 80 that provides simultaneous imaging of 4 spectral bands, or 4 sets of spectral bands, by 4 detector arrays, 56a, 56b, 56c and 56d. A dichroic beamsplitter 67 splits the spectrum between two pairs of detector arrays. For example, for a two-arm programmable spectral imaging system 80 designed for wavelengths from 440 nm to 1000 nm, the dichroic beamsplitter 67 could pass wavelengths below 550 nm and above 830 nm and transmit those in between. In addition, the near-IR arm 68i can be rotated to provide the needed physical separation between the light paths to detector array 56a and to detector array 56b and between the light paths to detector array 56c and detector array 56d. This specific embodiment would then provide simultaneous imaging of 4 different sets of wavelengths on 4 detector arrays: from 440 nm to 550 nm on detector array 56a, from 830 nm to 1000 nm on detector array 56b, from 550 nm to 660 nm on detector array 56c and from 660 nm to 830 nm on detector array 56d.

Figure 8:
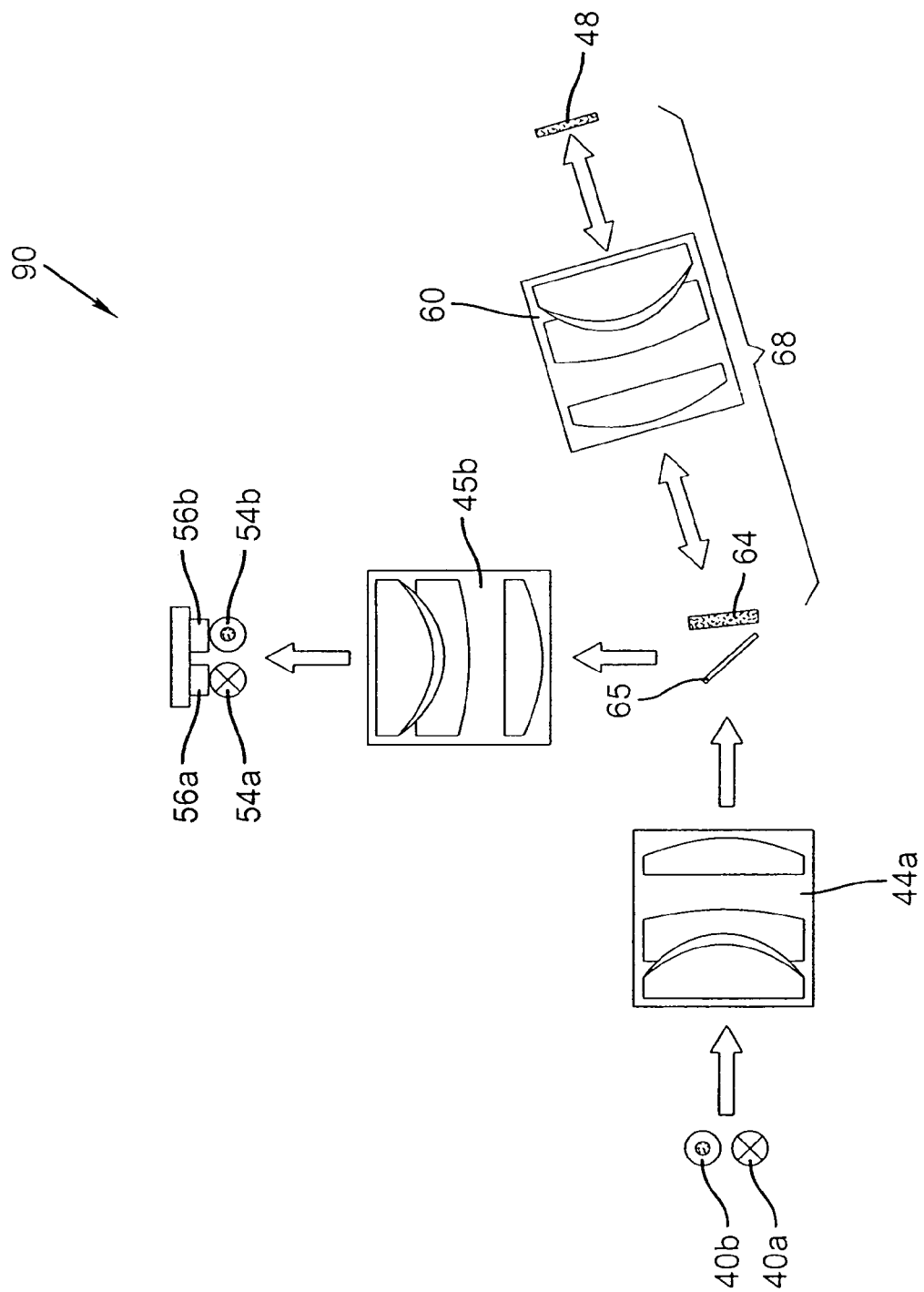
FIG. 8 illustrates a single arm embodiment with two separated input images and two corresponding detector arrays.

FIG. 8 illustrates an alternate approach for imaging onto multiple detector arrays. The programmable spectral imaging system 90 is similar to the system of FIG. 4a, except it contains two separated input multi-wavelength images, 40a and 40b, with two corresponding detector arrays, 56a and 56b. This system provides simultaneous capture of two spectrally-filtered output images, 54a and 54b, that have different spectral bands. The separation (in wavelength) between the two spectral bands is fixed, but the center wavelength and bandwidth can be programmed jointly.

The invention has been described in detail with particular reference to certain preferred embodiments thereof, but it will be understood that variations and modifications can be effected within the spirit and scope of the invention.

PARTS LIST

40 Multi-wavelength image
40a Multi-wavelength image
40b Multi-wavelength image
42a Dispersive imaging subsystem
42b De-dispersive imaging subsystem
44 Primary mirror
44a Lens
44b Spectrally-filtered output image
45a Lens
45b Lens
46 Reflection grating
46a Transmission grating
46b Transmission grating
47 Stop
48 Spatial light modulator
48i Spatial light modulator
48v Spatial light modulator
49 Parallel modulator elements
50 Programmable spectral imaging system
51a Blocking operating state
51b Unblocking operating state
52 Spectrally-dispersed images
54 Spectrally-filtered output image
54a Spectrally-filtered output image
54b Spectrally-filtered output image
56 Detector array
56a Detector array
56b Detector array
56c Detector array
56d Detector array
57 Projected monochromatic image
60 Lens
60i Lens
60v Lens
62 Input imaging light
63 Turning mirror
64 Holographic volume phase grating
64i Holographic volume phase grating
64v Holographic volume phase grating
65 Patterned mirror
65a Transmissive region
65b Reflective region
66 Patterned dichroic
66a Dichroic region
66b Dichroic region
66c Dichroic region
67 Dichroic beamsplitter
68 Dispersive arm
68i Near-IR arm
68v Visible arm
70 Scanning subsystem
72 Extended object
74 Lens
77 Scanning mirror
80 Two-arm programmable spectral imaging system
90 Programmable spectral imaging system

What is claimed is:

1. An imaging system having a programmable spectral transmission function, comprising:
   a) an input image plane for passing input imaging light into the imaging system;
   b) a dispersive optical system for separating the input imaging light into its corresponding spectral components, thus creating spectrally-dispersed image components;
   c) a diffractive spatial light modulator, including at least a diffractive and a non-diffractive operational state, for selecting spectral components for imaging that are comprised of diffracted orders of light;
   d) a de-dispersive optical system for re-combining the selected spectral components for imaging onto a detector array; and
   e) a blocking optical elements for blocking non-selected spectral components.

2. The imaging system claimed in claim 1, further including:

f) means for scanning the input imaging light from an object of interest to generate an output area image.

3. The imaging system claimed in claim 1, wherein a grating period of the diffractive spatial light modulator is parallel to a dispersion direction of the spectrally-dispersed image components.

4. The imaging system claimed in claim 1, wherein the diffractive spatial light modulator is a GEMS device.

5. The imaging system claimed in claim 1, wherein the spectral components for imaging are comprised of a plurality of diffracted orders.

6. The imaging system claimed in claim 1, wherein the detector array is a time-delayed integration linear array.

7. The imaging system claimed in claim 1, wherein a width of the projected monochromatic image of the detector array on the diffractive spatial light modulator is less than approximately $\frac{1}{3}$ of a width of the diffractive spatial light modulator in a spectrally-dispersed direction.

8. The imaging system claimed in claim 1, wherein the blocking optical elements is selected from the group consisting of absorbing stops, reflective stops, patterned mirrors and patterned dichroics.

9. The imaging system claimed in claim 1, wherein both the dispersive and the de-dispersive optical system comprise shared optical elements that are used in a double-pass configuration.

\* \* \* \* \*